US011625726B2

(12) United States Patent
Pinel et al.

(10) Patent No.: US 11,625,726 B2
(45) Date of Patent: Apr. 11, 2023

(54) TARGETED ALERTS FOR FOOD PRODUCT RECALLS

(71) Applicant: International Business Machines Corporation, Armonk, NY (US)

(72) Inventors: Florian Pinel, New York, NY (US); Larisa Shwartz, Greenwich, CT (US)

(73) Assignee: International Business Machines Corporation, Armonk, NY (US)

(*) Notice: Subject to any disclaimer, the term of this patent is extended or adjusted under 35 U.S.C. 154(b) by 837 days.

(21) Appl. No.: 16/448,446

(22) Filed: Jun. 21, 2019

(65) Prior Publication Data

US 2020/0402070 A1 Dec. 24, 2020

(51) Int. Cl.
*G06Q 30/014* (2023.01)
*G06F 18/24* (2023.01)
*G06V 20/10* (2022.01)
*G06F 18/22* (2023.01)
*G06V 10/75* (2022.01)

(52) U.S. Cl.
CPC .......... *G06Q 30/014* (2013.01); *G06F 18/22* (2023.01); *G06F 18/24* (2023.01); *G06V 10/75* (2022.01); *G06V 20/10* (2022.01)

(58) Field of Classification Search
None
See application file for complete search history.

(56) References Cited

U.S. PATENT DOCUMENTS

| 9,299,241 | B1* | 3/2016 | Monical | G08B 27/005 |
| 10,636,037 | B1* | 4/2020 | Elzoghbi | G06Q 30/014 |
| 10,762,511 | B1* | 9/2020 | Pope | G06Q 30/014 |
| 11,282,089 | B1* | 3/2022 | Benamou | G06V 20/10 |
| 2007/0069004 | A1 | 3/2007 | Adler | |
| 2009/0144104 | A1 | 6/2009 | Johnson | |
| 2009/0204415 | A1 | 8/2009 | Baiera | |
| 2010/0145730 | A1 | 6/2010 | Abreu | |
| 2010/0280963 | A1 | 11/2010 | Fordyce, III et al. | |
| 2011/0258065 | A1 | 10/2011 | Fordyce, III et al. | |
| 2012/0078682 | A1* | 3/2012 | Pinsley | G06Q 30/016 705/7.29 |

(Continued)

OTHER PUBLICATIONS

M. T. Islam, B. M. N. Karim Siddique, S. Rahman and T. Jabid, "Food Image Classification with Convolutional Neural Network," 2018, 2018 International Conference on Intelligent Informatics and Biomedical Sciences (ICIIBMS), pp. 257-262. (Year: 2018).*

(Continued)

*Primary Examiner* — Sarah M Monfeldt
*Assistant Examiner* — Michael J. Monaghan
(74) *Attorney, Agent, or Firm* — Mark Bergner (57) ABSTRACT

A system and associated method may utilize a processor that receives recall product instance group (RPIG) information (RPIGI) identifying a set of instances of products having a product type identifier (PTI) that are a subject of a product recall. The processor receives, from an imaging device associated with a user, an image containing a product instance. The method further comprises applying a classifier and determining a PTI. Based on the image, secondary product information is also identified. These may be compared with the RPIGI to determine a product instance membership. Information related to the product instance membership in the RPIG may be displayed.

15 Claims, 5 Drawing Sheets

(56) References Cited

U.S. PATENT DOCUMENTS

| | | | |
|---|---|---|---|
| 2012/0183185 A1* | 7/2012 | Grigsby | G06Q 30/0641 382/128 |
| 2012/0259789 A1* | 10/2012 | Farmer | G06Q 30/016 705/318 |
| 2012/0323678 A1* | 12/2012 | Mansfield, Jr. | G06Q 30/0207 705/16 |
| 2012/0330971 A1* | 12/2012 | Thomas | G06F 16/283 707/748 |
| 2013/0036061 A1 | 2/2013 | Alexander et al. | |
| 2013/0080251 A1* | 3/2013 | Dempski | G06Q 30/01 705/304 |
| 2013/0105578 A1* | 5/2013 | Bolanos | G06Q 50/28 235/385 |
| 2013/0254120 A1* | 9/2013 | Waite | G06Q 30/014 705/303 |
| 2014/0104385 A1* | 4/2014 | Wong | G06Q 30/016 382/110 |
| 2014/0236844 A1* | 8/2014 | Shaw | G06Q 30/012 705/303 |
| 2015/0032638 A1* | 1/2015 | Dintenfass | G06Q 30/012 705/302 |
| 2015/0032639 A1 | 1/2015 | Cherifi | |
| 2015/0221011 A1* | 8/2015 | Kavanagh | G06Q 30/0623 705/26.61 |
| 2016/0027084 A1* | 1/2016 | Otero | G06Q 30/0627 705/26.25 |
| 2016/0092882 A1 | 3/2016 | Small | |
| 2016/0154823 A1 | 6/2016 | Bhagwan et al. | |
| 2016/0267570 A1* | 9/2016 | Hodges | H04L 67/32 |
| 2017/0337559 A1* | 11/2017 | Hancock | G06Q 10/30 |
| 2018/0033016 A1* | 2/2018 | Mayman | G06Q 30/012 |
| 2018/0165690 A1* | 6/2018 | Fordyce, III | G06Q 10/10 |
| 2018/0225673 A1* | 8/2018 | Dubey | G06Q 10/10 |
| 2018/0253733 A1 | 9/2018 | Lewis et al. | |
| 2018/0365820 A1* | 12/2018 | Nipe | G06K 9/6274 |

OTHER PUBLICATIONS

Min, W., Jiang, S., Liu, L., Rui, Y., & Jain, R., "A survey on food computing," 2018, ACM Computing Surveys (CSUR), 52(5), pp. 1-41. (Year: 2018).*

Aggdata, "#1 Source For Locational Data," https://www.aggdata.com/, printed Mar. 19, 2019, 5 pgs.

Authors: N/A; Ttl: USFDA Draft Guidance For Strengthening Public Warning And Notification Of Product Recalls; Publ. Ttl: Mondaq Business Briefing; 2018; Publisher: Mondaq Ltd.; Country of Publication: USA; ISSN: N/A; Database: Gale Group Trade & Industry Database.

Mell et al., "The NIST Definition of Cloud Computing," Recommendations of the National Institute of Standards and Technology, U.S. Department of Commerce, Special Publication 800-145, Sep. 2011, 7 pgs.

United States Department of Agriculture Food Safety and Inspection Service, "Current News Releases," https://www.fsis.usda.gov/wps/portal/fsis/newsroom/news-releases-statements-transcripts/news-release-archives-by-year, printed Mar. 19, 2019, 2 pgs.

United States Department of Agriculture Food Safety Inspection Service, "News Releases, Statements, Transcripts," https://www.fsis.usda.gov/wps/portal/fsis/newsroom/news-releases-statements-transcripts/news-release-archives-by-year, printed Jun. 21, 2019, 2 pgs.

* cited by examiner

TARGETED ALERTS FOR FOOD PRODUCT RECALLS

BACKGROUND

Disclosed herein is a system and method for implementing targeted alerts for food product recalls.

When a problem with a product is discovered, it is desirable to quickly notify any consumers who may have purchased or otherwise acquired the product about the potential problem. When the problem involves agricultural products, the United States Department of Agriculture (USDA) may track available information about a problem product. Once a sufficient amount of information is known, the USDA may send out a recall n.3otice on a variety of different channels with as much information as is available. Other government and non-government entities may collect information about products and send out similar notices as well.

However, such notices should be just broad enough to identify specific products that may be the subject of a recall, and not over broad. For example, a recall of tainted spinach should be limited to a particular producer and, if possible, particular dates or sources of origin of the product. Unfortunately, it may not be technically feasible to know which consumers may be in possession of specific product instances that are the subject of a recall.

SUMMARY

According to one or more embodiments, a computer-implemented method is provided. In the method, a processor receives recall product instance group (RPIG) information (RPIGI) that identifies a set of instances of products that have a product type identifier and that are a subject of a product recall. The processor receives, from an imaging device associated with a user, an image containing a product instance. The method further comprises applying a classifier to assess aspects of the image, and then determining, using the classifier, a product type identifier for the product instance. Based on the image, secondary product information is identified that may be symbol data and/or text data of the product instance. The product type identifier and the secondary product information are compared with the RPIGI. Responsive to the comparing, a member determining operation determines a product instance membership. Responsive to the member determining operation, the method displays, on a display device to the user, information related to the product instance membership in the RPIG.

According to one or more embodiments, a computer system is provided. The computer system comprises a device comprising a processor and a memory comprising instructions that, when executed by the processor, configure the processor to perform various operations. A processor may receive recall product instance group (RPIG) information (RPIGI) that identifies a set of instances of products having a product type identifier and that are a subject of a product recall. It may also receive, from an imaging device associated with a user, an image containing a product instance. A classifier may be applied to assess aspects of the image, which is then used to determine, a product type identifier for the product instance, identify, based on the image, secondary product information selected from the group consisting of symbol data and text data of the product instance. The product type identifier and the secondary product information may be compared with the RPIGI, and responsive to the comparison, in a member determining operation, the system may determine a product instance membership. Responsive to the member determining operation, the system may display, on a display device to the user, information related to the product instance membership in the RPIG.

According to one or more embodiments, a computer program product may include a computer-readable storage medium (or media) having computer readable program instructions thereon for causing a processor to carry out operations described herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise noted, in addition to any combination of features belonging to one type of subject-matter, any combination between features relating to different subject-matter, in particular, between features of the methods and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following acronyms may be used below:
API application program interface
ARM advanced RISC machine
CCD charge coupled device
CD-ROM compact disc ROM
CPU central processing unit
DPS data processing system
DVD digital versatile disk
EPROM erasable programmable read-only memory
FDA United States Food and Drug Administration
FPGA field-programmable gate arrays
HA high availability
IaaS infrastructure as a service
I/O input/output
IPL initial program load
ISP Internet service provider
ISA instruction-set-architecture
LAN local-area network
LCD liquid crystal display
LED light emitting diode
NLP natural language processor OCR optical character recognition
PaaS platform as a service
PDA personal digital assistant
PLA programmable logic arrays
QR quick response
RAM random access memory
RISC reduced instruction set computer
ROM read-only memory
RPIG recall product instance group
RPIGI RPIG information
SaaS software as a service
SLA service level agreement
SRAM static random access memory
USDA United States Department of Agriculture
VIN vehicle identification number
WAN wide-area network "Consumer alert" may refer to, in some embodiments, a message or warning directed to a consumer.

"Product identifier" may refer to, in some embodiments, an identifier, possibly unique, for a product type.

"Recall" may refer to, in some embodiments, a notice or consumer alert provided by a government entity, such as the USDA or FDA, a manufacturer or producer, or some other entity, indicating a problem or defect with a product type or a subset of product types. Often, but not necessarily, the recall may indicate some action required on the part of the end user to perform if they are in possession of a product that is a subject of the recall.

"User" may refer to, in some embodiments, a person or entity who acquires, possesses, or images a product instance.

"Imaging device" may refer to, in some embodiments, a device that may capture an image or moving image of a scene. An imaging device may be a camera, such as a digital camera, a film camera, or a camera that is able to store a captured image for later recall. Typical imaging devices may utilize a CCD for storing images, and may comprise memory and/or an I/O port for communicating the captured image to another computer.

"Product instance" may refer to, in some embodiments, a specific real-world instantiation of a product type. A product type typically has an identifier (product identifier) that may refer to, in some embodiments, a product having various predefined criteria. A car model (e.g., Chevrolet Corvette) is an example of a product type, and a car having a particular VIN is an example of a product instance. Many less expensive products do not have individual unique identifiers for identifying individual instances of the product.

"Secondary product information" may refer to, in some embodiments, product information in addition to a product type that may be present as text and/or symbols on the product instance itself, or on a container, wrapper, or label of the product instance. Secondary product information may comprise information that identifies a source of origin for the product instance, such as a plant or line that processed the product instance, a date on which the product instance was made or on which the product instance expires, a lot number, and other information that may further identify the product instance, the conditions or associated equipment by which it was processed, etc. It may further comprise product attributes, such as shape, size, volume, weight, color, or features, or other information such as a logo, linear (1D) barcode, or matrix (2D) barcode (e.g., a QR® code).

"Product type" may refer to, in some embodiments, an identifying descriptor for products having a common set of attributes. A product type may be described by a product identifier.

"Image processor" may refer to, in some embodiments, software and/or hardware that is used to process pixels of an image into higher level structural elements.

"Text processor" may refer to, in some embodiments, a processing element that receives character or word-level low-level data and produces from the low-level data high level data having a higher level meaning, such as data elements in a database or the like. An NLP may be utilized as an example of a text processor.

"Product instance group" may refer to, in some embodiments, a set of product instances.

"Category" may refer to, in some embodiments, a characteristic of objects that may be grouped together on the basis of similarity.

"Classifier" may refer to, in some embodiments, an algorithm that maps input data to a specific type of category.

"Product type identifier" may refer to, in some embodiments, an identifier that identifies a type of product or a group of products having common characteristics.

"Recall product instance group" may refer to, in some embodiments, a group of product instances that are subject to a recall. Such a group may be defined by, e.g., a product identifier, a source of production, an expiration date, or other relevant data that identifies a set of products to which the recall applies.

"Product instance group information" may refer to, in some embodiments, information about a product instance group that may help identify particular product instances that are within the product instance group. It may contain, among other things, a date of production, a date of expiration, a lot number, a location, related production equipment, and related employee information "Recall product instance group information" may refer to, in some embodiments, information about a recall product instance group that may help identify particular product instances that are within the recall product instance group.

"Display device" may refer to, in some embodiments, an output user interface device, such as an LCD or LED array, used to display text and/or graphical information to a user.

"Food storage device" may refer to, in some embodiments, a refrigerator, freezer, cooler, cabinet, or any other device in which food products may be stored.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
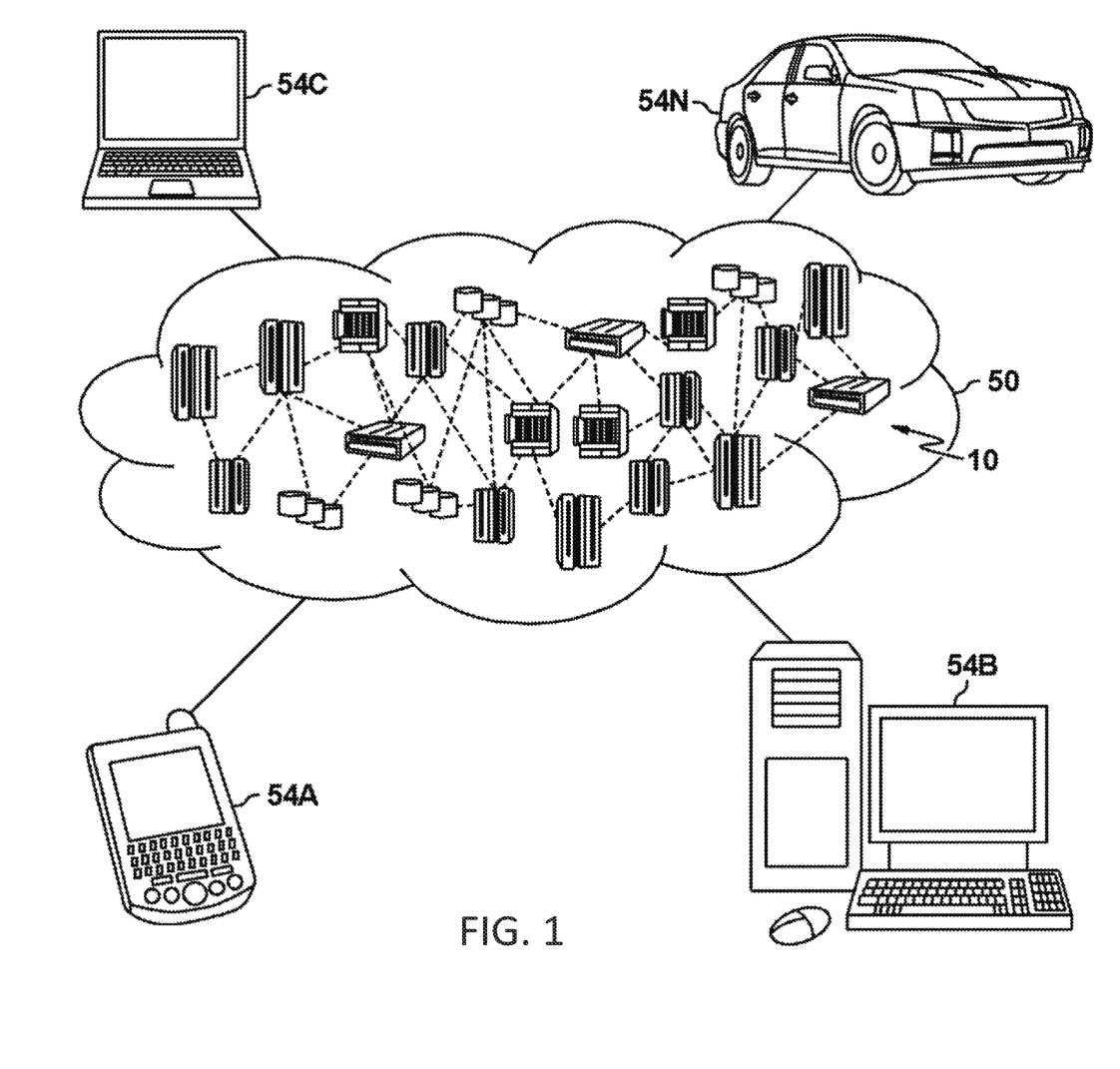
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
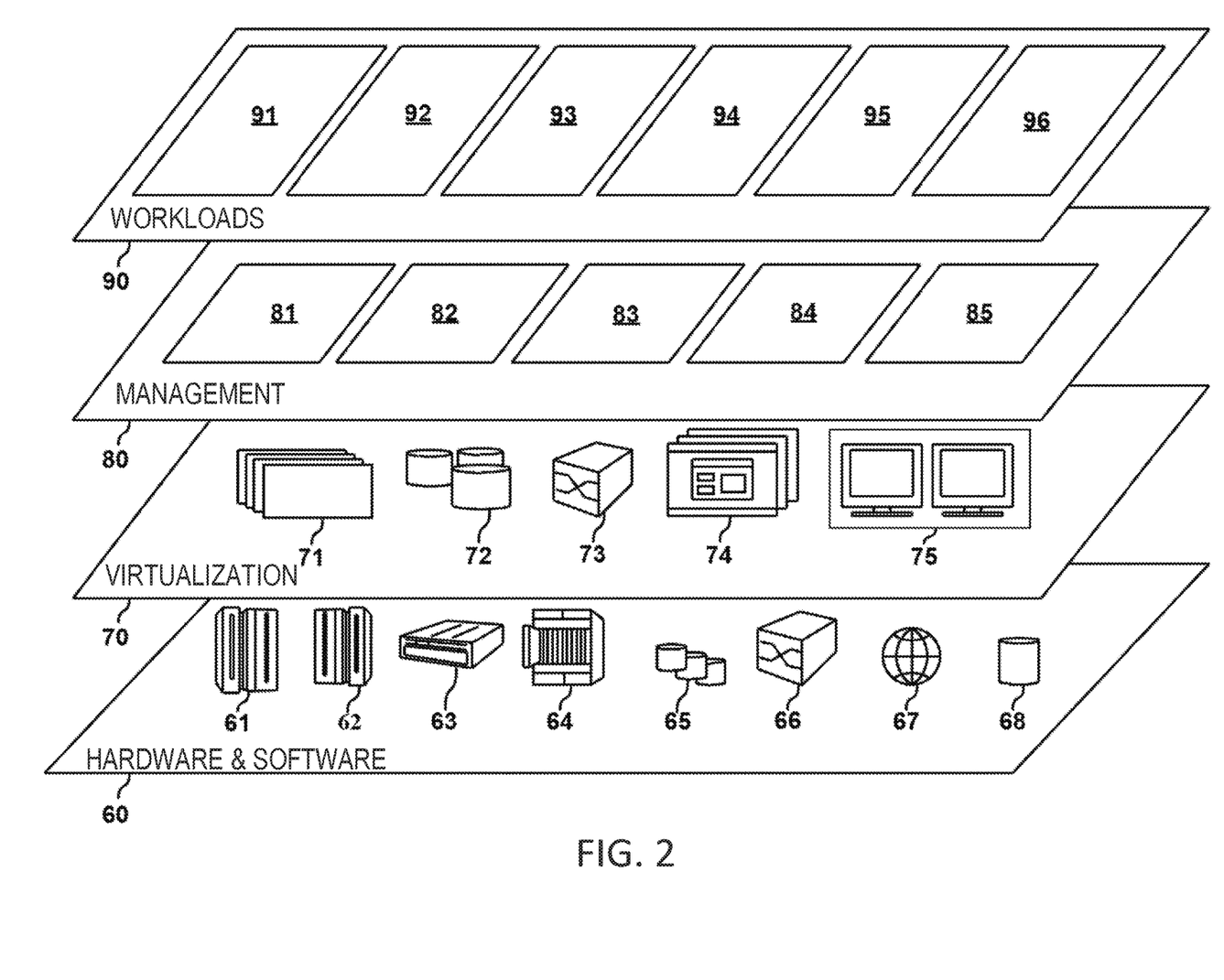
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
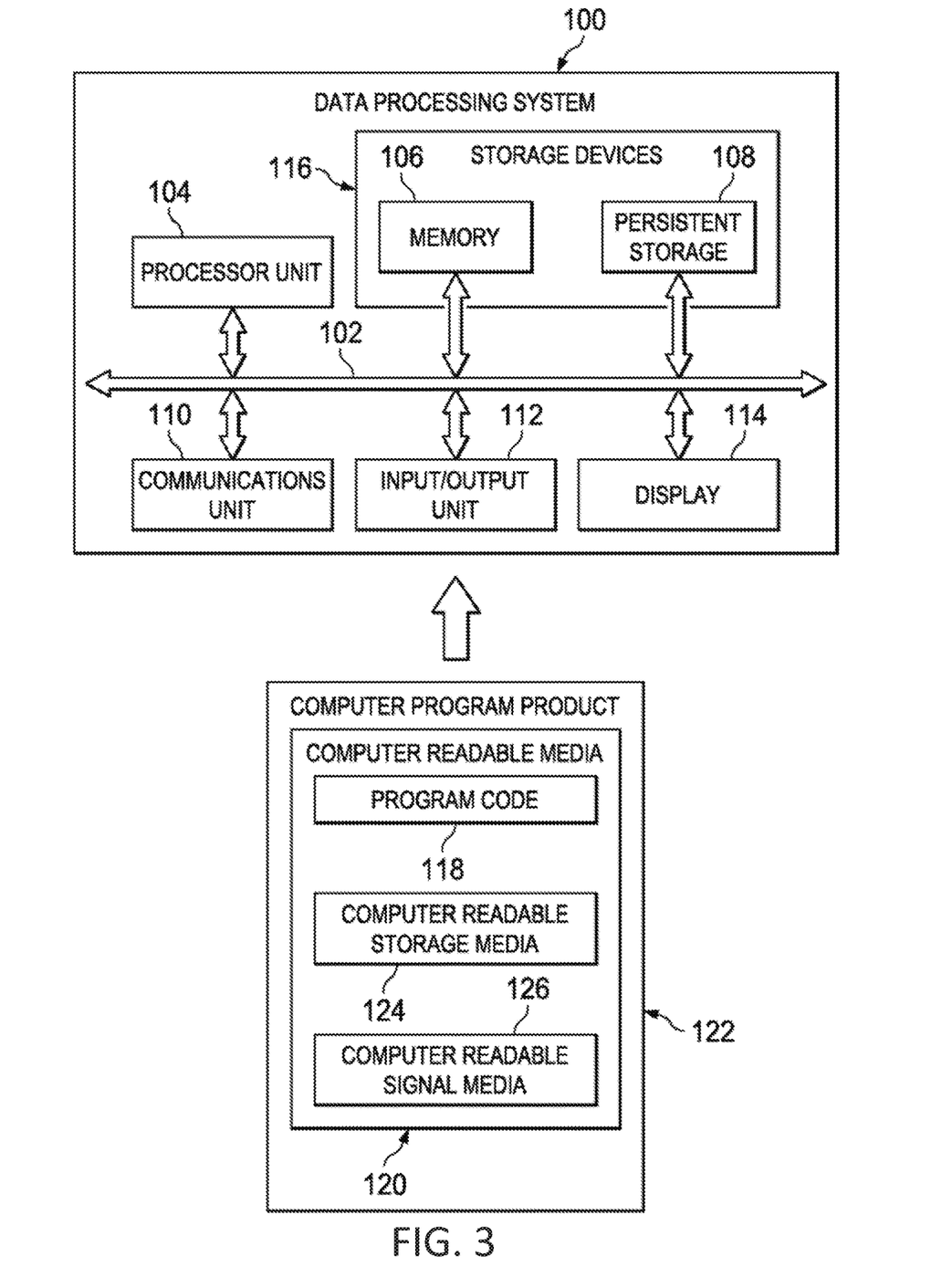
FIG. 3 is a block diagram of a data processing system according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code 118, computer usable program code, or computer readable program code that may be read and executed by a processor in the processor unit 104. The program code 118 in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 3 may be varied from the illustrative examples shown.

Figure 4:
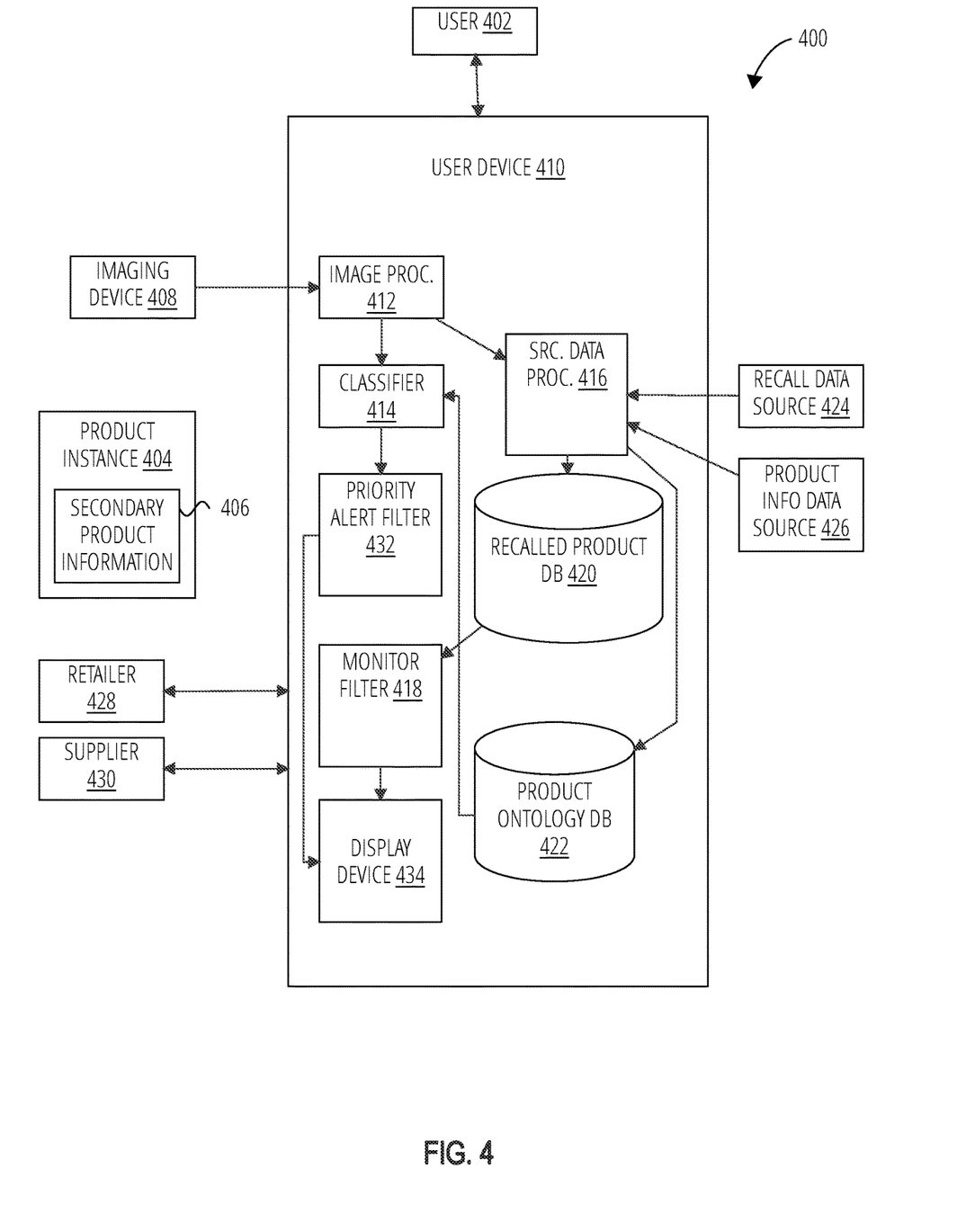
FIG. 4 illustrates a system in accordance with one embodiment.

FIG. 4 is a block diagram illustrating a system 400 that may be used to determine if a product acquired by a user 402 is one that is the subject of a product recall, according to some embodiments disclosed herein. A use case will be used for the discussion below as a way of illustrating concepts of the various embodiments described herein. However, the use case should in no way be construed as limiting the scope of the various embodiments described herein. In the example use case, a user 402 purchases an eight-ounce container of contaminated spinach from a retailer 428 Healthee Foodz. The container had a barcode placed on it by Healthee Foodz identifying it only as an eight-ounce container of spinach. However, the container was wrapped by the supplier 430 Eco Li, and the wrapper contained additional information printed on the wrapper—namely, the supplier company name, the location at which the spinach was processed, Fresno, Calif., and the expiration date of the spinach, Mar. 1, 2019, which, according to the supplier 430 rules, is three weeks beyond the processing date that the spinach was placed in the container.

The user 402 brings the spinach container home and stores it in their food storage device. At the time of sale, no problem for this particular lot of spinach was known. However, the following day, the USDA learns that spinach of Eco Li produced at the Fresno, Calif. location and having an expiration date between Feb. 20, 2019, and Mar. 3, 2019, is contaminated and needs to be recalled. The following describes an example series of events that may occur pursuant to this use case.

The user 402 may have a user device 410, such as DPS 100, running an application that assists the user 402 in identifying relevant recall events. A product recall source 424 may be a recall entity that is monitored by a source data processor 416, including a product recall system or a product recall list. Upon learning of the contaminated spinach, the USDA as the recall data source 424, may send out an alert message to the user device 410 containing RPIGI. The application on the user device 410 may be listening for such information in some embodiments. In other embodiments, the recall data source 424 provides the RPIGI in a database, datastore, blog, or some other location that is accessible by the user device 410. In this case, the application on the user device 410 may periodically poll a predefined location for information relevant to recalls, such as the RPIGI. The application on the user device 410 may be alerted to recall information through any other product info data source 426, such as news feeds, other social media, and the like.

In some embodiments, the product info data source 426 may be or include a server that is used for collecting and disseminating information related to the RPIGI. For example, it may be a server to which image data or other information related to various users' product instances or product type identifier may be received or uploaded, stored, and shared amongst other users or with other entities (e.g., governmental entities) who have a stake/interest in this information. It may also just be a file or data access point to which additional information may be uploaded and shared by different users. The server may have a communication device that transmits to other users the server product information and receives from other users' additional server product information. By communicating with the product info data source 426, the amount of information about the RPIG may be vastly expanded based on additional information provided by the users 402 or users' devices 410, which may serve to enhance the speed that other users are able to recognize and learn about recalls for products in their possession. The server may, in some embodiments, make a determination of other users 402 who may have purchased their own product instances of the RPIG. The determination of other users 402 may be made in the same way as described herein for making this determination of the users 402. A predetermined certainty level may be utilized to determine the likelihood of the other users 402 having purchased a product instance from the RPIG. Other users 402 who have been determined as likely to have purchased a product instance of the RPIG may be contacted with the RPIGI to alert them of the possibility that they have potentially purchased a contaminated product. Such a server and/or the product info data source 426 may be a DPS 100 as described above. The server may exist in a cloud computing environment 50, as described above, with the users' devices 410 being, for example, cloud computing nodes 10. However, any other traditional client-server or peer-to-peer network configuration may be utilized to implement some embodiments. In some embodiments, the user device 410 may directly inform other users 402 or their respective user devices 410 of the possibility that they are likely to have purchased a product instance of the RPIG.

The RPIGI may be provided to the user device 410 as text information. When this is the case, the text may be processed by a source data processor 416 into more readily processable binary data and stored in a recalled product database 420. Information about the recalled product need not be received solely from the recall data source 424, but may come from any product info data source 426—such information may also be sent to the source data processor 416 and parsed in a similar manner. Information collected from either or both of the recall data source 424 and the product info data source 426 beyond that relevant for recall may be stored in a product ontology database 422. Such information may include, but is not limited to, images of the product type, related products, information about others having problems with this product type or related products, and the like.

In some embodiments, it may not be desirable to present the user 402 with a notice for each and every recall of every product, and thus, a preliminary filtering may take place. A monitor filter 418 may access information from the recalled product database 420, and preliminary filtering may determine whether the RPIGI received rises to the level of notifying the user 402 of potential relevance (e.g., is considered to be user relevant). By way of example, the monitor filter 418 may determine that the user 402 often purchases spinach from any retailer, or that the user 402 frequently purchases other vegetables from the retailer 428 known to carry spinach. If there is no basis to conclude that the recall likely involves products used by the user 402, then no further action needs to be taken by the application, although it may continue to monitor the user 402 activities for relevant events, such as the user 402 purchasing spinach from the retailer 428 after the USDA recall notice has been sent. The monitor filter 418 may be applied prior to receiving any image data associated with the product instance 404.

If there is a basis to conclude that the recall may involve products used by the user 402, and if it is possible to specifically conclude that the product instance 404 is, in fact, a member of the RPIG, e.g., without any further action, then information related to the product instance membership in the RPIG, such as a priority alert, may be sent to the display device 434. Such a priority alert may be provided in the form of a message or display containing relevant information to let the user 402 know specifically the product instance 404 serving as the subject of the alert. Such relevant information may include the product description along with any of the RPIGI, an image of the product or product type, etc. It may also include instructions as to recommended actions for the user 402, such as throwing the product away and getting a refund, getting a replacement product, bringing the product to a service center for repair or exchange, etc. The message may be provided, e.g., in a red color, flashing border, or any other form to help ensure that the user 402 notices the alert.

However, in many situations, it may not be possible to specifically conclude that the product instance 404 is a member of the RPIG based solely on transaction data that may be available from the retailer 428 or user 402 financial records, since such transaction data may not contain detailed secondary product information 406 needed to make this determination. At best, in many situations, transaction data between the user 402 and the retailer 428 may only have a product identifier and a date/time that the purchase was complete. For example, in the use case described above, the transaction data may indicate that a purchase of an eight ounce container of spinach was purchased from Healthee Foodz at a particular date and time, but may not contain information related to the source of the spinach nor its expiration date that would be needed to specifically identify it as being a subject of the recall. Even less information may be available when the user 402 makes a cash purchase. In such a situation, the only information that may be readily available is user 402 location data that may be available on the user device 410 that tracks user 402 location via GPS and, using external databases, determines that the user 402 spent time at a retailer 428 who may have sold some of the tainted product.

When incomplete information is available, but based on the information that the application was able to obtain, there is some predetermined likelihood that the user 402 may have acquired a product that is the subject of the recall, the application may either alert the user 402 of this likelihood or, when able, initiate an inquiry for additional information. The alert provided to the user 402 in this case should not be as prominent or severe as the alert provided when a definitive determination can be made, as described above—such an alert may be made to the user 402 indicating that they may have purchased a product that is the subject of a recall, but that further information is needed.

In some embodiments, the user 402 may be provided with as many details as possible. For example, in the above use case, the user 402 may be alerted to the spinach recall as well as the spinach's source and expiry date range of the product instance group information. In this case, the user 402 may be provided with an image of the spinach and/or other related information and asked to take one or more photographs of the product instance 404 with her imaging device 408, such as a camera of her user device 410. She may be prompted in instructions related to user assistance for acquiring the image, to record several images of the product instance 404 from several different angles to ensure that any relevant information from the packaging be obtained. In some embodiments, the user 402 may enter secondary product information 406 of the product instance 404 that is visible to them on their user device 410 or some other device. Additionally, the user may photograph the product instance 404 at a time of purchase. If the product instance 404 is a member of the RPIG at the time of purchase, then the actions described herein for this condition may follow. However, if the product instance 404 is not a member of the RPIG at the time of purchase, then the transaction data for the purchase of the product instance 404 may still be saved on the user device 410 or in another location so that the user 402 may be alerted in the event of a relevant product recall.

Once an indication of user assistance responsive to determining that the RPIGI may be user relevant, information related to the user assistance may be processed. Any secondary product information 406 obtainable from one or more product instance images provided by the user device 410 or a related device may be processed and used to either make a definitive determination that the product instance 404 is a member (or not) of the RPIG, or to establish a greater or less likelihood that the product instance 404 is a member of the RPIG. In some embodiments, imaging devices of the place the product instance 404 is stored may be used. By way of example, an IoT-based food storage device may contain multiple imaging device 408 units that monitor activities in the food storage device. These may be coupled to the user device 410 via a network connection, such as a wireless connection (Bluetooth, Wi-Fi, etc.) or may be connected to a remote server containing an application with similar functionality as described herein for the application associated with the user device 410.

In some embodiments, images of multiple products may be analyzed to determine if they may fit within the RPIG. In the use case described above, according to some embodiments, the imaging device 408 and/or the image processor 412 associated with the food storage device may need to segregate the spinach package from other food items captured in an image of the contents of the food storage device. In this situation, the classifier 414 may make use of information in the product ontology database 422 to determine which package contains spinach before proceeding on to later stages of the analysis. The product ontology database 422 may be utilized to further augment the proceed information by adding, e.g., a UPC or QR code, a product image, and the like. In addition to recognizing the products themselves, the classifier 414 may further be used to recognize logos (which may be useful for determining a product source), specific portions of the label, perform text OCR to read dates and plant numbers—in some embodiments, with user assistance.

In any case, the priority alert filter 432 may receive image information from the image processor 412 and process it along with other information received to determine if a predefined threshold has been reached with regard to a likelihood that the product instance 404 is a member of the RPIG. By way of example, in the use case described herein, the imaging device 408 was able to obtain the expiration date of the product instance 404 as the secondary product information 406, but was not able to obtain the source of the plant that produced the product. If the priority alert filter 432 is able to determine that the product instance 404 date is outside of the recall date, then the application can definitively determine that the product instance 404 is outside of the RPIG and that no further action or alerts are needed. However, if the priority alert filter 432 is able to determine that the product instance 404 date is within the recall date, then the probability that the product instance 404 is a member or the RPIG has risen, and the user 402 may then be alerted to this fact.

The user device 410 running the application could be the food storage device, as described herein, or could be a smart phone, smart watch, or smart glasses, and the like. Also, the application could be provided to devices that are involved in the purchase of the product by the user, such as a product scanner or checkout terminal in a supermarket. In this instance, it may be possible to communicatively couple or associate the user device with the device running the application located in the retailer 428 place of business.

In some embodiments, once a user 402 product instance 404 has been definitively identified, or identified according to some predefined likelihood (which may be configurable, and such predefined likelihoods for each of the activities described herein may be configured separate from each other) as belonging to the RPIG, information about this located product instance 404 may be provided to other users. By way of example, in the event that the retailer 428 had not yet been made aware of the recall, the user device 410 may be used to communicate with the retailer 428 any information about the product instance 404 of relevance. Furthermore, the user device 410 may be utilized to alert user devices of other users' details related to the product instance 404 and the RPIG. The application in the other user devices may have a similar application which treats the current user device 410 reporting the recall information as a product info data source 426. Similarly, the retailer 428 may alert other users with the recall information as well. As more data is collected from more users, a list of purchase dates and retailer 428 locations selling the recalled product may be created.

When the product instance 404 is determined to definitively be a member of the RPIG (or with some high threshold level of certainty), pictures of the product instance 404 and/or its constituent components may be added to a dataset, such as the recalled product database 420, the product ontology database 422, or similar database to use as a feedback data set or a training data set for retraining or enhancing the classifier 414. Additionally, if information about the retailer 428 is unknown, the location information of the user may be utilized to determine where the user likely purchased the product instance 404, and the retailer 428 information may be sent to a server that collects the retailer 428 information and shares this information with other users and possibly the supplier 430 as well. In this way, an accurate determination of retailers 428 who have sold contaminated products may be made and disseminated in a relatively efficient manner.

Caution may be exercised when definitive determinations, according to some definitive determination threshold, cannot be made. When a product instance 404 is definitively determined to be a member of the RPIG (e.g., a product identifier, lot number, date, etc. associated with the RPIG can be clearly read from the product instance 404 and matched to the RPIGI), and it can be definitely determined that the product instance 404 was acquired from a specific retailer 428, then the retailer 428 may be notified and other users may be notified that the specific retailer 428 is currently selling products covered by the RPIG. However, when the product instance 404 membership in the RPIG cannot be clearly determined and/or the specific retailer 428 who sold the product instance 404 cannot be clearly determined, caution may be exercised in sharing the information, lest a mistake be made and a retailer's 428 reputation be damaged or sales harmed due to false information. In this situation, less drastic measures may be taken.

By way of example, the product instance 404 is definitively determined to be a member of the RPIG—using the use case, the user is in possession of spinach from the tainted lot. However, in the use case, the transaction cannot be linked with certainty to a particular retailer 428, e.g., because the user 402 made a cash purchase of the spinach and it is detected that the user 402 visited two different retailers 428 who each sell spinach. In this situation, a limited response may be applied, i.e., other users might not be alerted with information about the two different retailers because it cannot be definitively determined which one sold the tainted spinach. However, it may be proper to communicate with each of the two stores that they may have sold the tainted spinach, sharing with them the RPIGI and requesting that they check their spinach offerings. Such retailers may be referred to as "likely retailers" since, e.g., there may be some likelihood that they are a source of the tainted product or products in the RPIG. A likely retailer may be determined by, e.g., accessing a likely retailer transaction database, scanning a receipt containing information associated with the likely retailer, and/or accessing user location data and likely retailer location data to determine the user presence at the likely retailer location.

Figure 5:
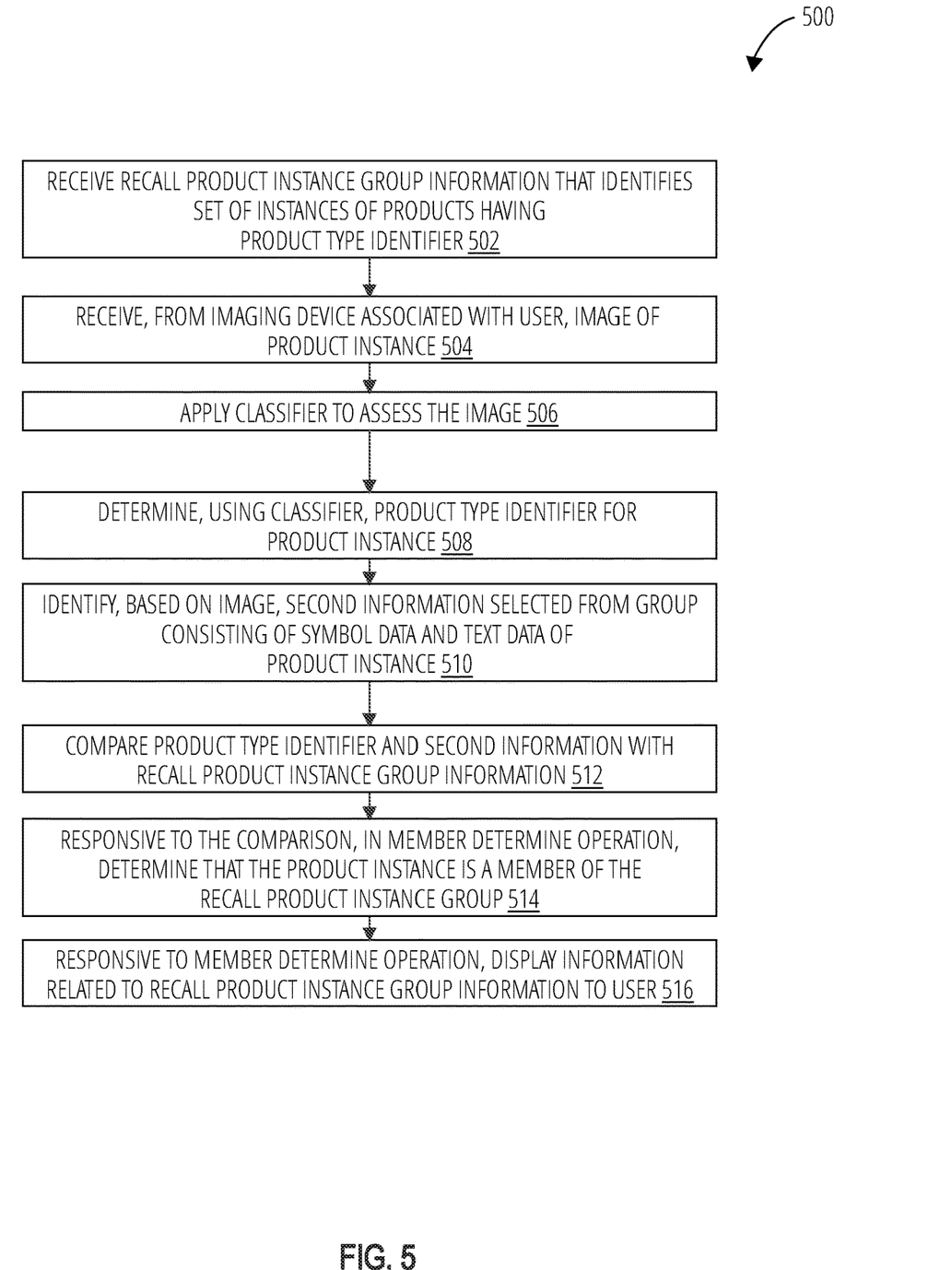
FIG. 5 illustrates a routine for determining whether a product instance is a member of a recalled product instance group in accordance with one embodiment.

FIG. 5 is a flowchart of an example process 500 that may be used to implement some embodiments. In operation 502, the user device 410 may receive RPIGI from the recall data source 424 that identifies a set of product instances having a particular product type identifier and secondary product information 406. The source data processor 416 may convert the RPIGI and store it in the recalled product database 420. In operation 504, the user device 410 or other device associated with the user 402 may receive, from the imaging device 408, an image of the product instance 404. This image may be processed by the image processor 412 into image data of the product instance 404. In operation 506, a classifier 414 (the term "classifier", as used herein, may include multiple classifiers that focus on multiple aspects) may be applied to assess the image, and in operation 508, a product type identifier for the product instance 404 may be determined using the classifier's 414 analysis of the image.

Using the above-identified use case, the classifier 414 may identify the container in the image as well as the contents of the container as being spinach, and it may further identify information about the size of the container as well as any information related to the contents of the container, such as a UPC or QR code, text, etc. In operation 510, from the image and possibly using a classifier 414 regarding labels or other text position on a wrapper or container of the product instance 404, the secondary product information 406 may be identified from text or symbol data that may be used to identify a product instance 404. Different classifiers 414 may be used, e.g., to recognize products, recognize logos, and specific portions of labels, etc. Detectors may be used to detect specific portions of the label, and OCR may be utilized to read text-based information from the label, wrapper, container, etc.

In operation 512, the process 500 may compare the product type identifier and the secondary product information 406 with the RPIGI stored in the recalled product database 420 in order to determine, as best as possible, whether the product instance 404 is a member of the RPIG. In operation 514, responsive to performing the comparison, in a member-determining operation, the priority alert filter 432 may determine whether or not the product instance 404 is a member of the RPIG, or at least to increase or decrease the likelihood that it is, based on available information. Different predefined threshold levels may be used to determine a categorization of the membership for the product instance in the RPIG, including that the product instance is: a) a member of the RPIG, b) a possible member of the RPIG when a predefined membership threshold is met or exceeded, c) a possible non-member of the RPIG when a predefined membership threshold is not met, and d) a non-member of the RPIG.

In operation 516, when the product instance 404 is identified as being a member of the RPIG (e.g., membership category (a)), or has a likelihood of being so according to a predefined probability threshold (e.g., membership category (b)), then an action may be taken to alert the user 402 by, for example, displaying information related to the product instance membership in the RPIG or, for example, displaying an alert on the display device 434 of the user device 410 and/or retailer 428, supplier 430, other users, and anyone else associated with the product type. When the product instance 404 is identified as being a possible non-member of the RPIG (e.g., membership category (c)) or is identified as not being a member of the RPIG (e.g., membership category (d)), in some embodiments the user is not notified.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
 receiving, by a processor, recall product instance group (RPIG) information (RPIGI) that identifies a set of instances of products having a product type identifier that are a subject of a product recall;
receiving, from an imaging device associated with a user, an image containing a product instance;
applying a classifier to assess aspects of the image;
determining, using the classifier, the product type identifier for the product instance;
identifying, based on the image, secondary product information;
comparing the product type identifier and the secondary product information with the RPIGI;
responsive to the comparing, in a member determining operation, determining a product instance membership for the product instance; and
responsive to the member determining operation, displaying, on a display device to the user, information related to the product instance membership in the RPIG comprising a message or display containing relevant information to let the user know specifically the product instance service as a subject for an alert;
wherein the product instance membership is selectable from each of the group consisting of:
a) a member of the RPIG,
b) a possible member of the RPIG when a predefined membership threshold is met or exceeded,
c) a possible non-member of the RPIG when the predefined membership threshold is not met, and
d) a non-member of the RPIG;
the method further comprising:
responsive to the determination that the product instance membership is definitively (a), providing the image to a database selected from the group consisting of a recalled product database and a product database;
using the database including the provided image as a feedback data set or a training data set for retraining or enhancing the classifier; and
responsive to the member determining operation, displaying information related to the product instance on the display device to the user only when the product instance in the member determining operation is selected from the group consisting of (a) and (b).

2. The method of claim 1, further comprising, responsive to the determination that the product instance membership is selected from the group consisting of (a) and (b):
determining a likely retailer at which the product instance was purchased; and
sending information related to the likely retailer to a product information data source.

3. The method of claim 1, further comprising monitoring a recall entity selected from the group consisting of a product recall list and a product recall system, wherein the receiving of the RPIGI results from the monitoring.

4. The method of claim 1, wherein the RPIGI is information selected from the group consisting of a date of production, a date of expiration, a lot number, a location, related production equipment, and related employee information.

5. The method of claim 1, further comprising:
prior to receiving the image, performing a monitoring filter on the RPIGI to determine when the RPIGI is user-relevant based on prior purchases of the user; and
responsive to determining the RPIGI is user-relevant, displaying on the display device instructions related to user assistance for acquiring the image.

6. The method of claim 5, further comprising receiving an indication of user assistance responsive to the determining that the RPIGI is user relevant.

7. The method of claim 1, wherein the image is a plurality of images that capture the product instance from a plurality of angles.

8. The method of claim 1, wherein the imaging device is selected from the group consisting of a food storage imaging device, a smart phone, a smart watch, smart glasses, a product scanner, a checkout terminal, and a camera.

9. The method of claim 1, wherein the secondary product information includes information selected from the group consisting of product attributes, dates, and source of origin.

10. A computer system, comprising:
a device comprising a processor and a memory comprising instructions that, when executed by the processor, configure the processor to:
receive, by the processor, recall product instance group (RPIG) information (RPIGI) that identifies a set of instances of products having a product type identifier and that are a subject of a product recall;
receive, from an imaging device associated with a user, an image containing a product instance;
apply a classifier to assess aspects of the image;
determine, using the classifier, the product type identifier for the product instance;
identify, based on the image, secondary product information selected from the group consisting of symbol data and text data of the product instance;
compare the product type identifier and the secondary product information with the RPIGI;
responsive to the comparison, in a member determining operation, determine a product instance membership for the product instance; and
responsive to the member determining operation, display, on a display device to the user, information related to the product instance membership in the RPIG comprising a message or display containing relevant information to let the user know specifically the product instance service as a subject for an alert;
wherein the product instance membership is selectable from each of the group consisting of:
a) a member of the RPIG, b) a possible member of the RPIG when a predefined membership threshold is met or exceeded,
c) a possible non-member of the RPIG when the predefined membership threshold is not met, and
d) a non-member of the RPIG;
wherein the processor is further configured to:
responsive to the determination that the product instance membership is definitively (a), provide the image to a database selected from the group consisting of a recalled product database and a product database;
use the database including the provided image as a feedback data set or a training data set for retraining or enhancing the classifier; and
responsive to the member determining operation, displaying information related to the product instance on the display device to the user only when the product instance in the member determining operation is selected from the group consisting of (a) and (b).

11. The system of claim 10, wherein the processor is further configured to:
responsive to the determination that the product instance membership is selected from the group consisting of (a) and (b):
determine a likely retailer at which the product instance was purchased; and
send information related to the likely retailer to a product information data source.

12. The system of claim 10, wherein the processor is further configured to:
- prior to receiving the image, perform a monitoring filter on the RPIGI to determine when it is user relevant; and
- responsive to determining the RPIGI is user relevant, display on the display device instructions related to user assistance for acquiring the image.

13. The system of claim 10, further comprising:
- a server comprising a server processor and a server memory comprising instructions that, when executed by the server processor, configure the server processor to:
  - receive and store server product information comprising the image and further information related to an element selected from the group consisting of the product instance and the product type identifier.

14. The system of claim 13, wherein the server processor is further configured to:
- responsive to the determination that the product instance membership is selected from the group consisting of (a) and (b):
- determine a likely retailer at which the product instance was purchased;
- send information related to the likely retailer to a product information data source;
- determine other users who may have purchased a product instance of the RPIG, based on a predetermined certainty level, at the identified retailer; and
- contact the other users with the RPIGI.

15. A computer program product for targeted alerts, the computer program product comprising a computer readable storage medium having program instructions embodied therewith, the program instructions readable by a processor to cause the device to:
- receive, by a processor, recall product instance group (RPIG) information (RPIGI) that identifies a set of instances of products having a product type identifier and that are a subject of a product recall;
- receive, from an imaging device associated with a user, an image containing a product instance;
- apply a classifier to assess aspects of the image;
- determine, using the classifier, the product type identifier for the product instance;
- identify, based on the image, secondary product information selected from the group consisting of symbol data and text data of the product instance;
- compare the product type identifier and the secondary product information with the RPIGI;
- responsive to the comparison, in a member determining operation, determine a product instance membership for the product instance; and
- responsive to the member determining operation, display, on a display device to the user, information related to the product instance membership in the RPIG comprising a message or display containing relevant information to let the user know specifically the product instance service as a subject for an alert;
- wherein the product instance membership is selectable from each of the group consisting of:
  - a) a member of the RPIG,
  - b) a possible member of the RPIG when a predefined membership threshold is met or exceeded,
  - c) a possible non-member of the RPIG when the predefined membership threshold is not met, and
  - d) a non-member of the RPIG;
- wherein the instructions further cause the processor to:
  - responsive to the determination that the product instance membership is definitively (a), provide the image to a database selected from the group consisting of a recalled product database and a product database;
  - use the database including the provided image as a feedback data set or a training data set for retraining or enhancing the classifier; and
  - responsive to the member determining operation, displaying information related to the product instance on the display device to the user only when the product instance in the member determining operation is selected from the group consisting of (a) and (b).

* * * * *